(12) United States Patent
Gautier

(10) Patent No.: US 6,889,543 B2
(45) Date of Patent: May 10, 2005

(54) WHEEL ASSEMBLY PROVIDED WITH A PRESSURE SENSOR

(75) Inventor: Antoine Gautier, Saint Cloud (FR)

(73) Assignee: Labinal, Montigny-le-Bretonneux (FR)

( * ) Notice: Subject to any disclaimer, the term of this patent is extended or adjusted under 35 U.S.C. 154(b) by 0 days.

(21) Appl. No.: 10/031,758

(22) PCT Filed: May 15, 2001

(86) PCT No.: PCT/FR01/01475

§ 371 (c)(1),
(2), (4) Date: Jan. 17, 2002

(87) PCT Pub. No.: WO01/94133

PCT Pub. Date: Dec. 13, 2001

(65) Prior Publication Data

US 2002/0105222 A1 Aug. 8, 2002

(30) Foreign Application Priority Data

Jun. 5, 2000 (FR) .............................. 00 07166

(51) Int. Cl.$^7$ .................. B60C 23/02; B60C 23/06; B60B 37/00
(52) U.S. Cl. ................. 73/146.4; 73/146.2; 73/146.5; 116/34 R; 301/1
(58) Field of Search .................. 301/1, 108.1; 152/415; 116/34 R; 73/146.2, 146.3, 146.4, 146.5, 146

(56) References Cited

U.S. PATENT DOCUMENTS

| 4,075,603 A | | 2/1978 | Snyder et al. | |
|---|---|---|---|---|
| 4,947,151 A | * | 8/1990 | Rosenberger | 340/426 |
| 5,033,295 A | * | 7/1991 | Schmid et al. | 73/146.5 |
| 5,297,424 A | * | 3/1994 | Sackett | 73/146.5 |
| 5,583,482 A | * | 12/1996 | Chamussy et al. | 340/442 |
| 5,936,155 A | * | 8/1999 | Francois et al. | 73/129 |
| 5,939,977 A | * | 8/1999 | Monson | 340/442 |
| 6,259,361 B1 | * | 7/2001 | Robillard et al. | 340/447 |
| 6,362,733 B1 | * | 3/2002 | Momose et al. | 340/447 |
| 6,448,892 B1 | * | 9/2002 | Delaporte | 340/442 |

FOREIGN PATENT DOCUMENTS

| EP | 0 563 723 A1 | 10/1993 | |
|---|---|---|---|
| JP | 11-321255 | 11/1999 | |
| JP | 11321255 | 11/1999 | ........... B60C/23/02 |

* cited by examiner

Primary Examiner—Russell D. Stormer
Assistant Examiner—Jason R. Bellinger
(74) Attorney, Agent, or Firm—Darby & Darby

(57) ABSTRACT

A wheel assembly includes a wheel having a rim which is adapted to receive a tire. The wheel carries a sensor for measuring pressure inside the tire. The wheel is mounted so as to rotate around a spindle. In addition a communication device is located between the sensor and a device which is associated with the spindle for using measurements that are performed by the sensor. The communication device comprises a radio transmission device which includes a rotary antenna carried by the wheel and a fixed antenna that is carried by the spindle.

4 Claims, 2 Drawing Sheets

WHEEL ASSEMBLY PROVIDED WITH A PRESSURE SENSOR

The present invention relates to a wheel assembly of the type comprising:
- a wheel having a rim adapted to receive a tire, the wheel carrying a sensor for measuring pressure inside the tire;
- a spindle around which the wheel is mounted to rotate; and
- communication means between the sensor and means associated with the spindle for making use of measurements performed by the sensor.

BACKGROUND OF THE INVENTION

In airplanes, it is useful, from within the cockpit, to be able to determine the pressure of tires on wheels in the landing gear.

For this purpose, it is known to mount a pressure sensor on the wheel rim, which sensor is suitable for measuring the inflation pressure of the tire mounted on the rim. The pressure sensor sends the value of the measurement it performs to an information processor unit placed on the fixed portion of the landing gear or inside the body of the airplane.

This makes it necessary to provide means for transmitting information between the moving and the fixed portions of the landing gear.

In particular, it is known to provide two concentric coils respectively on the hub of the wheel and on the spindle on which the hub is mounted to rotate, the coils together constituting a transformer. The coil carried by the hub is connected to the pressure sensor while the coil carried by the wheel spindle is connected to the information processor unit.

The signal delivered by the sensor to the coil carried by the hub and corresponding to the value of the pressure in the tire induces a signal in the coil carried by the spindle of the landing gear. This signal is analyzed by the information processor unit in order to deduce therefrom the pressure in the tire.

That solution operates in satisfactory manner. Nevertheless, the presence of two concentric coils makes the arrangement relatively bulky. Using a transformer to transmit information between two mutually rotary portions requires precautions to be taken concerning the electromagnetic environment.

OBJECTS AND SUMMARY OF THE INVENTION

An object of the invention is to provide a solution to this problem by proposing a wheel assembly enabling information to be transmitted between the wheel and the fixed portion supporting the wheel by means of an arrangement that is reliable and compact.

To this end, the invention provides a wheel assembly of the above-specified type, wherein said communication means comprise radio transmission means including a rotary antenna carried by the wheel and a fixed antenna carried by the spindle.

In particular embodiments, the wheel assembly further comprises one or more of the following characteristics:
- the spindle has a free end, and the fixed antenna and the rotary antenna are disposed in the vicinity of the free end of the spindle;
- the rotary antenna and the fixed antenna are placed facing each other in succession in line with the spindle;
- the rim includes a hub with a through passage in which the spindle is engaged, and it further includes a cap closing said passage in line with the free end of the spindle, the rotary antenna being carried by the cap on its face looking towards the spindle, the cap, the spindle, and the hub defining an essentially closed space within which the rotary antenna and the fixed antenna are confined;
- the rotary antenna and the fixed antenna are generally circularly symmetrical, and they are disposed substantially coaxially about the axis of rotation of the wheel;
- each of the rotary antenna and the fixed antenna comprises a set of metal turns carried by a support, which turns form the transmission and/or reception elements of the antenna; and
- said set of metal turns of the rotary antenna is carried directly by the cap forming a support.

BRIEF DESCRIPTION OF THE DRAWINGS

The invention will be better understood on reading the following description given purely by way of example and made with reference to the drawings, in which.

MORE DETAILED DESCRIPTION

Figure 1:
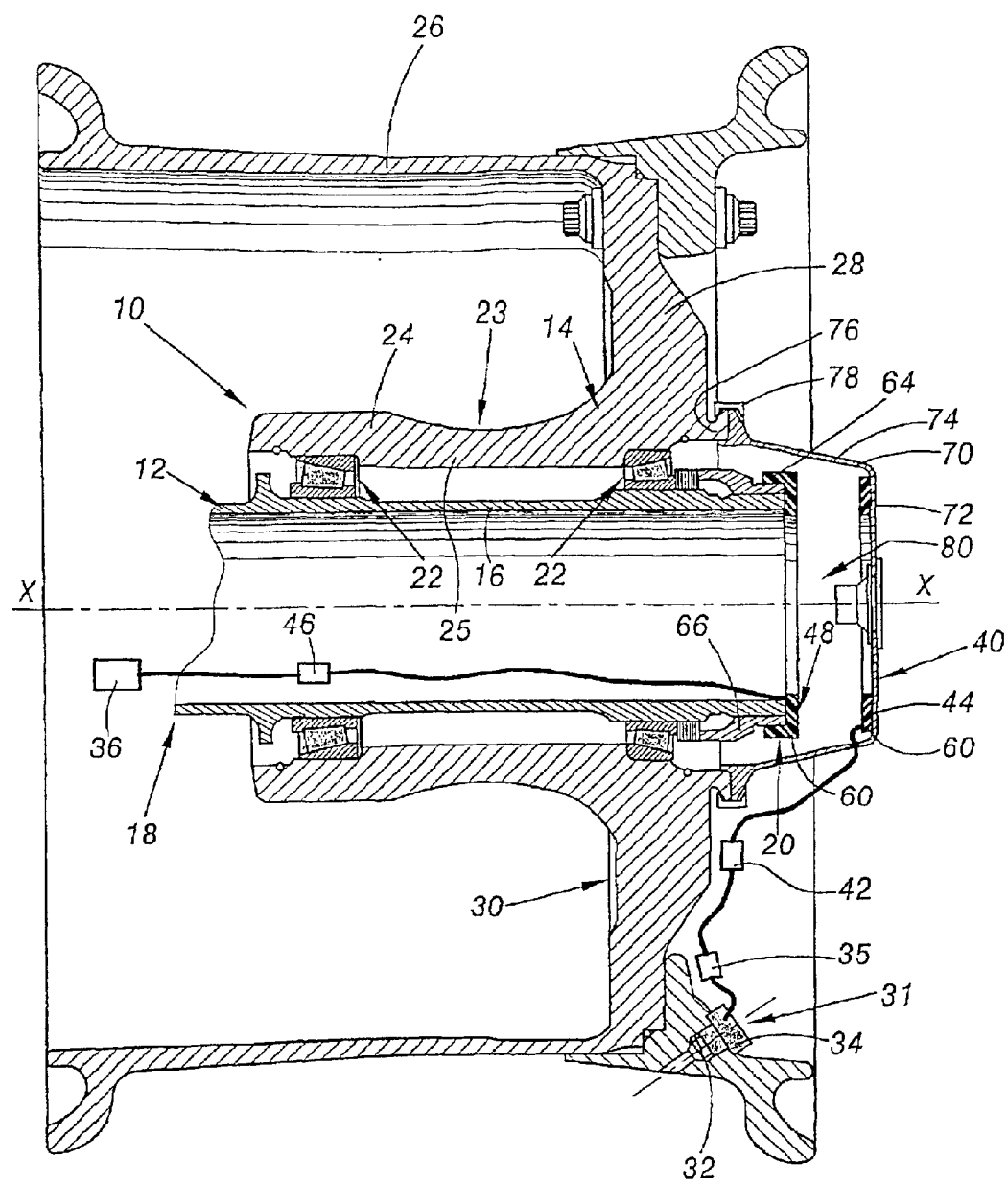
FIG. 1 is a longitudinal section view of a wheel assembly of the invention, the tire being omitted.

The wheel assembly 10 shown in FIG. 1 forms part of the landing gear of an airplane. It includes a landing gear spindle 12 constituting a fixed portion, and a wheel 14 mounted to rotate about the axis X—X of the spindle.

The spindle 12 has a generally tubular body 16 about the axis X—X. The body 16 is connected at one end 18 to the remainder of the structure of the landing gear. At its other end, referenced 20, the body 16 forms a free end of the spindle.

The wheel 14 is mounted to rotate about the spindle 12 via two roller bearings 22 that are spaced apart along the axis of the spindle.

The wheel 14 comprises a rim 23 on which a tire (not shown) is mounted. The rim 23 comprises a hub 24 with a through passage 25 along which the spindle 12 extends together with the two bearings 22.

The rim 23 also has an outer cylindrical wall 26 for supporting a tire. The hub 24 and the wall 26 are interconnected by radial arms 28 separated from one another by ventilation slots 30.

A pressure sensor 31 is mounted on the wheel. To this end, and in conventional manner, the cylindrical wall 26 of the wheel is fitted with a housing 32 in which a pressure probe 34 of the sensor is mounted for the purpose of measuring the pressure inside the tire on the wheel. The sensor 31 also includes a signal processing and probe controlling module 35, said module being connected to the probe.

An information processor unit 36 is secured to the fixed portion of the landing gear or to the airplane body.

The sensor 31 and the information processor unit 36 are connected to each other by communication means given overall reference 40. These communication means are adapted to establish radio communication between the sensor 31 and the information processor unit 36. This transmission is both-way, i.e. each entity can send and receive information.

In addition, the communication means are adapted to use radiowaves to transmit the electrical energy needed to enable the sensor 31 to operate.

More precisely, the communication means 40 comprise a signal modulator/demodulator (modem) unit 42 carried by the wheel 14. This signal-shaping unit is connected both to the sensor 31 and to a rotary antenna 44 secured to the wheel.

In analogous manner, the communication means 40 also comprise a signal modem unit 46 carried by the spindle and connected to the information processor unit 36. This unit 46 is connected to a fixed antenna 48 carried by the spindle 12.

The antennas 44 and 48 are adapted to enable signals to be transmitted and received at radio frequencies. Advantageously, these signals are at a frequency lying in the range 125 kilohertz (kHz) to 2.2 gigahertz (GHz).

The antennas 44 and 48 are disposed facing each other so as to establish radio communication between the moving and fixed portions of the wheel assembly.

For this purpose, they are disposed in the vicinity of the free end 20 of the spindle. They extend substantially parallel to each other in planes perpendicular to the axis of rotation X—X of the wheel. These antennas are located at the end of the landing gear spindle 12, in its extension.

Figure 2:
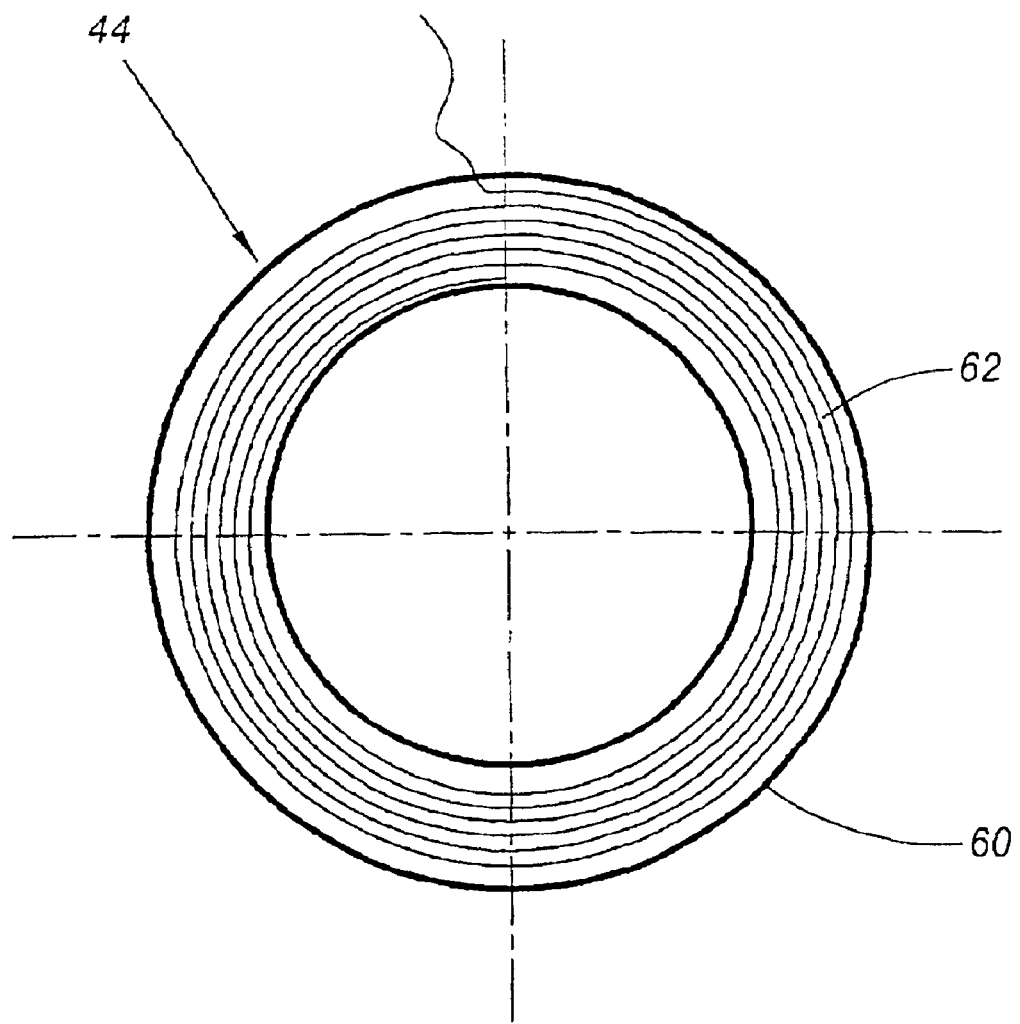
FIG. 2 is an elevation view of one of the two antennas implemented for transmitting information between the two portions of the wheel assembly.

As shown in FIG. 2, each antenna is of generally circular symmetry. Thus, it comprises a rigid support ring 60 having a set of conductive metal turns 62 placed on one face thereof to form a radiating element. By way of example, these turns can be formed by tracks of a printed circuit.

Advantageously, both antennas 44 and 48 are of substantially identical dimensions. The radiating elements of the antennas are placed facing one another.

The antennas are thus disposed coaxially about the axis of rotation X—X of the wheel.

As shown in FIG. 1, the antenna 48 which is essentially identical to the antenna 44 is fixed at the free end 20 of the spindle. For this purpose, the support ring 60 of the antenna has a skirt 64 enabling it to be fastened to the outside surface of the spindle 12. More precisely, the antenna 48 is secured by the skirt 64 to a ring 66 screwed onto the spindle and serving to retain one of the bearings 22 in an axial direction.

The rotary antenna 44 placed facing the fixed antenna 48 is carried by a cap-forming cup 70 fitted to the rim 23 on the axis thereof. The cup 70 has an end wall 72 having the antenna 44 secured thereto. It also has a slightly tapering side wall 74. The periphery of this wall is fastened to an axial collar 76 formed on the rim. This fastening is provided by a ring 78, for example.

The cap formed by the cup 70 is located in line with the passage 25 passing through the hub, beyond the free end of the spindle. It thus serves to closes the passage 25.

The cap 70 co-operates with the end of the hub 24 and with the end of the spindle 12 to define a closed space 80 in which the antennas 44 and 48 are confined and in which they are protected from external attack.

In order to measure pressure, the information processor unit 36 controls the unit 46 so as to cause it to send a modulated signal from the fixed antenna 48 to the rotary antenna 44. This signal conveys information enabling the sensor 31 to be controlled. This signal also conveys the energy required for powering the unit 42 and the sensor 31.

The signal received by the rotary antenna 4 is demodulated and sent to the sensor 31. Under the control of the module 35, the sensor sends a reply to the modem unit 42 containing the result of the measurement performed by the probe 34. The signal as shaped by the unit 42 is then transmitted by the rotary antenna 44 and picked up by the fixed antenna 48. This signal as picked up is forwarded to the information processor unit 36 for further use.

It will be understood that the use of radio communication means reduces the overall bulk of the wheel assembly. Furthermore, the disposition of complementary antennas in line with the free end of the wheel spindle makes it possible to obtain good proximity of the antennas in a compact configuration. Furthermore, since the antennas are located inside the cup 70 they are protected from mechanical attack and from electromagnetic disturbance from the surroundings.

Finally, since the antennas have circular symmetry and are placed coaxially on the axis of rotation of the wheel, they always face each other and continuously provide each other with the same facing areas. As a result transmission quality is unaffected by wheel rotation.

In a variant embodiment, the rotary antenna 44 is formed directly on the cup 70 which is fitted to the wheel rim. Under such circumstances, the radiating elements, e.g. constituted by conductive turns, are made directly on the end wall of the cup 70, in which case the end wall itself is made of a material that does not conduct electricity.

What is claimed is:

1. A wheel assembly comprising:
   a wheel having a rim adapted to receive a tire, the wheel carrying a sensor for measuring pressure inside the tire;
   a spindle around which the wheel is mounted to rotate, said spindle having a free end; and
   a communication device disposed between the sensor and a device associated with the spindle for making use of measurements performed by the sensor;
   wherein said communication device comprises a radio transmission device including a rotary antenna carried by the wheel and a fixed antenna carried by the spindle, both of which are disposed in a vicinity of the free end of the spindle and are placed so as to face each other in succession in line with the spindle, and are generally circularly symmetrical, and wherein they are disposed substantially coaxially about the axis of rotation of the wheel.

2. A wheel assembly according to claim 1, wherein the wheel includes a hub with a through passage in which the spindle is engaged, and the assembly further including a cap closing said passage in line with the free end of the spindle, the rotary antenna being carried by the cap on a face that is parallel to the free end of the spindle and extends axially inward from said face, the cap, the spindle, and the hub defining an essentially closed space within which the rotary antenna and the fixed antenna are confined.

3. A wheel assembly according to claim 1, wherein each of the rotary antenna and the fixed antenna comprises a set of metal turns carried by a support, said turns form the transmission and/or reception elements of the antenna.

4. A wheel assembly according to claim 2, wherein each of the rotary antenna and the fixed antenna comprises a set of metal turns carried by a support, said turns form the transmission and/or reception elements of the antenna, and said set of metal turns of the rotary antenna is directly disposed on the cap which forms a support.

* * * * *